Sept. 18, 1945.  F. E. McMULLEN  2,385,220
CUTTER FOR AND METHOD OF CUTTING GEARS
Filed June 2, 1936  2 Sheets-Sheet 1
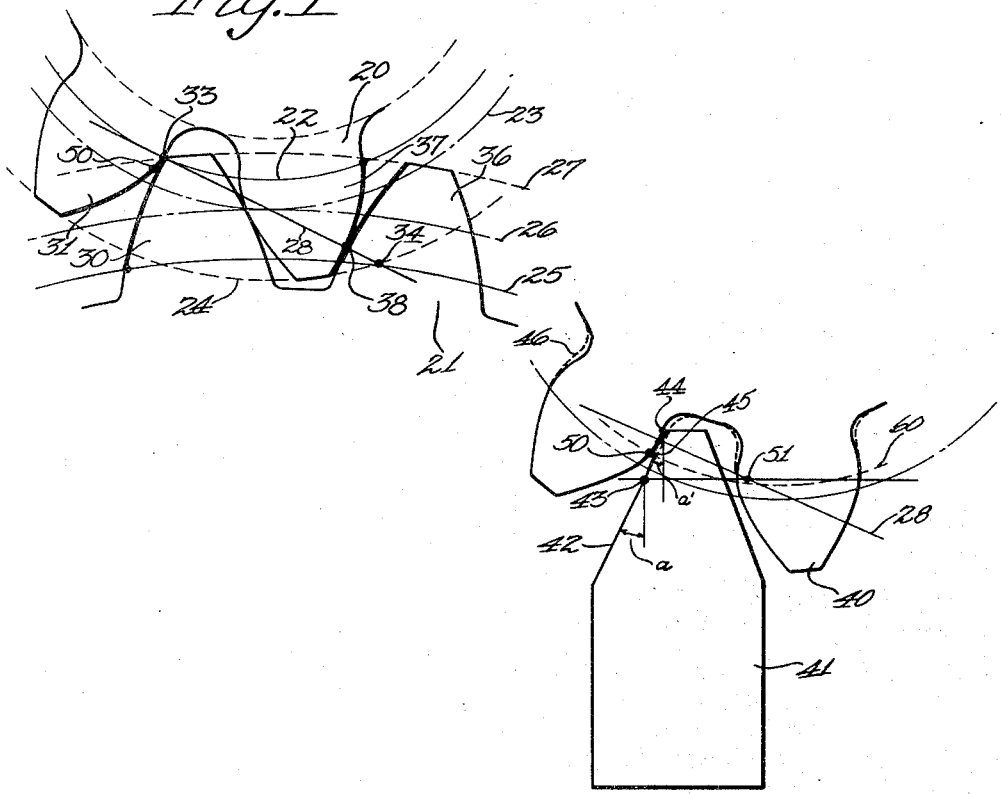
Fig. 1
Fig. 2
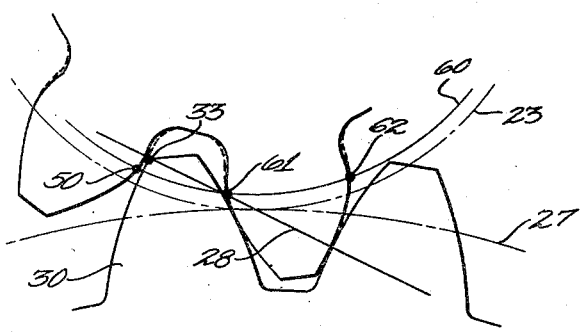
Fig. 3
Inventor
Frederick E. McMullen
By
B. J. Schlesinger
Attorney Sept. 18, 1945.   F. E. McMULLEN   2,385,220
CUTTER FOR AND METHOD OF CUTTING GEARS
Filed June 2, 1936   2 Sheets-Sheet 2
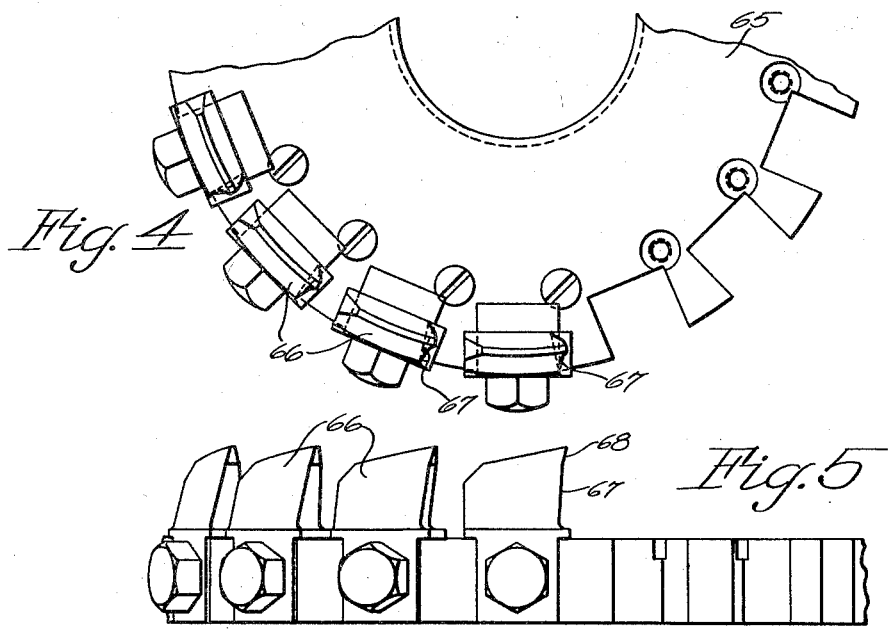
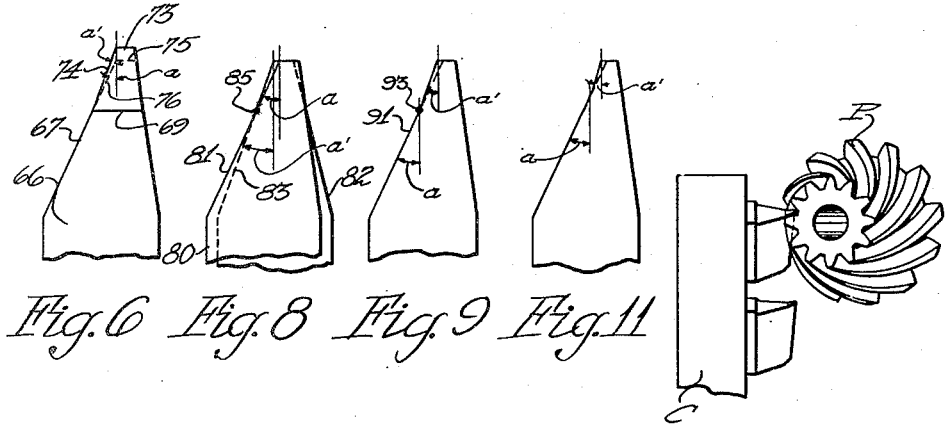
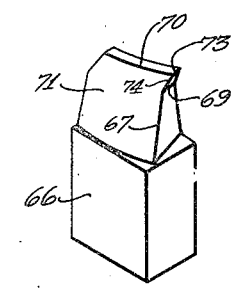

Patented Sept. 18, 1945

2,385,220

UNITED STATES PATENT OFFICE 2,385,220

CUTTER FOR AND METHOD OF CUTTING GEARS

Frederick E. McMullen, Rochester, N. Y., assignor to Gleason Works, Rochester, N. Y., a corporation of New York Application June 2, 1936, Serial No. 83,118

24 Claims. (Cl. 90—5)

The present invention relates to a method and to a tool for cutting gears and particularly to a method and tool for cutting longitudinally curved tooth gears especially spiral bevel gears.

In present day practice, particularly in the automotive field, it is quite common to lap gears, after they have been cut so as to get the smoothest possible tooth surface finish. When spiral bevel gears are lapped, however, there is frequently a heavy tooth bearing produced adjacent to the tips of the teeth of one gear of the pair, ordinarily the larger member of the pair, the driven member. This bearing or "top-line interference" as it is known in the trade is very objectionable because it causes the gears to be noisy in operation.

Various efforts have been made to eliminate the top-line bearing. It has been proposed, for instance, to use hypoid lap gears for lapping spiral bevel gears so as to produce a relative sliding action all over the active tooth surfaces of the bevel gear being lapped during the lapping operation and not have rolling motion at the pitch line and sliding elsewhere as occurs when a bevel gear is lapped with another bevel gear. Other proposals have included the introduction of various additional motions between the pair of gears being lapped during the lapping operation. One of the latest and most successful attempts along this line has been embodied in a machine in which a relative depthwise movement is produced between the gears during lapping to maintain a constant back-lash between the gears as they are rolled and displaced relative to one another in the lapping operation.

Attempts to use hypoid laps to lap bevel gears have not been very successful. It is a difficult task to produce a proper hypoid lap gear and such laps are, therefore, quite expensive. Better success has been attained with machines employing special lapping motions but these are very complicated and costly and have not fully met the problem.

The present invention attacks the problem from an entirely new angle. Instead of trying to eliminate the top-line interference by a special lapping motion or by a special lapping tool, it is the purpose of the present invention to cut one or both members of the pair so that the undesirable top-line contact will not be formed at all either in the lapping operation or in use. To this end, it is a further purpose of the invention to provide a simple form of tool especially for cutting the pinion of a spiral bevel gear pair which, in the generating operation, will roll out the tooth surfaces of the pinion at the bottoms of the flanks of the pinion teeth so that these portions of the flanks of the pinion teeth will not contact with the top parts of the flanks of the teeth of the mating gear when the pinion and gear are run together in the lapping process.

Several different possible embodiments of the invention are illustrated in the accompanying drawings in which:

Fig. 1 is a view illustrating diagrammatically the mesh of bevel gears as heretofore cut;

Fig. 2 is a view illustrating diagrammatically the cutting of one member of a pair of bevel gears according to the present invention;

Fig. 3 is a view illustrating diagrammatically the mesh of a pair of bevel gears when the pinion has been cut according to the process of the present invention;

Fig. 4 is a fragmentary plan view of a face-mill gear cutter for use in the process of the present invention and constructed according to one embodiment of the invention;

Fig. 5 is a fragmentary elevation of this cutter;

Figs. 6 and 7 are a fragmentary elevation and a perspective view, respectively, of one of the blades of the cutter shown in Figs. 4 and 5;

Fig. 8 is a view illustrating more or less diagrammatically another possible form of cutter which may be used in practicing the invention;

Figs. 9 and 10 are a fragmentary elevation and perspective view, respectively, of a different form of cutting blade which may be used in practicing the invention;

Fig. 11 is a still further modification of blade; and

Fig. 12 is a view illustrating diagrammatically the rolling out of the pinion tooth surfaces by the method of the present invention.

In Fig. 1 there is illustrated diagrammatically the mesh of a pair of spiral bevel gears of which the pinion is designated at 20 and the gear at 21. The pinion is assumed to be the driver and the heavy lines on one side of the teeth of both the gear and pinion indicate the portions of the flanks of the teeth which are in contact. 22 designates the base surface of the pinion, 23 its pitch surface, and 24 its top surface. The base surface of the gear is designated at 25, its pitch surface at 26, and the top surface at 27. 28 is the line of action between the gear and pinion teeth.

In the position shown, the tooth 30 of the gear is in contact with the tooth 31 of the pinion at the tip of the gear tooth and at one extreme point 33 of the line of action. The other extreme point of the line of action is designated as 34. The tooth 36 of the gear is in contact with the tooth 37 of the pinion at another point 38 in the line of action.

When bevel gears are lapped, there is a tendency toward a heavy bearing or contact to be produced at the tops of the flanks of the teeth of the driven member. Whatever the reason for this condition, and various suggestions have been offered, it is a condition very frequently encountered and it causes noise when the gears are run together in mesh.

In the ordinary process of generating a bevel gear, a tool is used of a given pressure angle and the tool has the same pressure angle all along its active surface.

The present invention proposes to eliminate top-line interference by cutting away that portion of the tooth surface of each pinion tooth which contacts with the top portion of the tooth surfaces of the gear.

To this end, it is proposed to generate the teeth of the pinion with a cutting tool which has a different, preferably smaller, cutting pressure angle at its tip than along the rest of its cutting surface. This is illustrated in Fig. 2.

Here the pinion to be cut is designated at 40 and the cutting tool employed in the generation of the pinion at 41. The cutting tool has a side cutting edge 42 which is of a given pressure angle $a$ for the greater portion of its length but of a different, smaller effective pressure angle $a'$ from the point 43 on its cutting edge to its tip 44.

Ordinarily in the generation of a bevel pinion, a cutting tool would be employed which would have one pressure angle $a$ along the whole length of the cutting edge so that the outer portion of its cutting edge would occupy the dotted line position designated at 45. When such a form of tool is employed, it will generate tooth surfaces on the pinion such as shown in Fig. 1, the dedendum portions of which are denoted by dotted lines 46 in Fig. 2. When a tool such as shown at 41 is employed, however, a portion of the side of the pinion tooth is generated by that portion of the cutting tool which has the pressure angle $a$ and the dedendum portion of the pinion tooth surface is generated by that portion of the cutting edge which has the pressure angle $a'$. Since the pressure angle $a'$ is smaller than the pressure angle $a$, the dedendum portion of the pinion tooth will occupy a position such as indicated in full lines in Fig. 2 which is set back away from the tooth surfaces which would be generated according to the methods of the prior art.

In Fig. 2 the line of action between gears generated according to the usual prior practice is again denoted at 28.

Experience will indicate to what height it is desirable that the tooth surfaces of the pinion be set back from the tooth surfaces which would be generated in the ordinary process. In Fig. 1 it is assumed for the sake of illustration that it is desirable to have the set-back in the tooth surfaces of the pinion begin with the point 50 so that there will be no contact between the tooth surfaces of the pinion below this point and the upper parts of the gear tooth surfaces. The point below which the tooth surface of the pinion is to be set back is again denoted as 50 in Fig. 2. This point is at the same radial distance from the center of the pinion as the point 51 and by projecting the point 51 to the point 43, it can readily be determined at what point the pressure angle of the cutting edge of the tool 41 should be changed in order to produce the setting back of the pinion tooth surfaces to the desired height.

Fig. 3 shows the mesh of a gear generated according to the usual prior practice and a pinion generated according to the process of the present invention. The gear teeth are designated again by the same reference numbers as are employed in Fig. 1 and the pinion teeth by the reference numerals employed in Fig. 2. It will be noted that at the point 33 of the line of action 28, there is no longer any contact between the gear and pinion teeth. The last points of contact between the teeth of the gear and pinion lie on the circle 60 which passes through the point 50 and other equi-radially located points, 61, 62, etc., of the pinion.

Various forms of tools may be employed in the practice of the present invention.

In Figs. 4 and 5, a face-mill gear cutting tool is shown comprising a cutter head 65 and a plurality of cutting blades 66. The cutting blades are arranged circularly about the axis of the head and have cutting portions which project beyond one side face of the head in the usual fashion. In the form of tool shown, all of the blades have outside cutting edges 67, and the front faces of the blades are formed with a hook adjacent to their tips as indicated at 68. The hook begins at a point on the blades corresponding to the point 43 of Fig. 2 and the effect of this hook is to provide a smaller pressure angle at the outer end of the cutting edge of the tool. This is illustrated more clearly in Figs. 6 and 7 where one of the blades 66 is shown on a somewhat enlarged scale. The hook begins at a point denoted by the line 69.

Each blade is, of course, relieved on its tip surface 70 and on its side surface 71 back of the cutting edge 67. It may also be relieved on the opposite side surface. In the case of this form of blade, the side surface 71 is of uniform or constant pressure angle for its full active height. It is the hook at the tip of the blade that gives the outer portion of the active cutting surface of the tool an effective cutting pressure angle which is less than the pressure angle of the side surface itself. This is clearly illustrated in Fig. 6. The outermost part of the blade is indicated at 73. The hook part of the cutting edge is indicated at 74. A line in the relieved top surface of the blade is denoted at 75 and a line in the relieved side surface of the blade is denoted at 76. It will be seen that with the hook, the blade has an effective cutting pressure angle $a'$ from the line 69 outwardly to the tip 70 which is less than the pressure angle $a$ of the side surface 71 of the blade itself.

Instead of using a hooked blade, a cutter may be employed having cutting blades 80 whose cutting edges 81 are of one pressure angle, $a$, and other cutting blades 82 whose side cutting edges 83 have a cutting pressure angle $a'$ which is less than the pressure angle $a$ and these blades may be so arranged in the cutter head that the side cutting edges 81 and 83 of the blades in projection cross one another at a point 85 corresponding to the point 43 on Fig. 2.

Still another possible form of tool is illustrated in Figs. 9 and 10. Here the side surface 90 of the cutting blade is so ground as to have two pressure angles $a$ and $a'$ and the cutting edge 91 has accordingly two pressure angles, a larger pressure angle $a$ for the greater portion of its length and a smaller pressure angle $a'$ adjacent to its tip. The point 93 at which the smaller pressure angle begins may correspond to the point 43 of Fig. 2.

In the embodiment of the invention shown in Figs. 9 and 10, there is an abrupt angle formed along the line 94 where the two portions of the blade which are of different pressure angle join one another. This abrupt juncture may be avoided by rounding off the blade toward its tip, as indicated in Fig. 11 to provide a cutting blade which has adjacent to its tip a pressure angle $a'$ less than the pressure angle $a$ of the greater portion of the effective height of the blade.

In the use of any of the tools shown in the drawings or in the use of tools made according to other embodiments of the invention, a cutting motion is imparted to the tool in engagement with the gear blank and simultaneously the blank P and the tool C are rolled relative to one another as indicated in Fig. 12. The relative rolling motion between tool and blank may be of any usual form. It may be imparted wholly to the tool, wholly to the blank, or in part to the tool and in part to the blank.

While ordinarily it is only necessary to cut one member of the pair according to the process of the present invention in order to achieve the desired results, and this member is usually the pinion which is the driver, it may be desirable in some instances to cut both members of the pair according to my process. This would be the case particularly where the pinion is sometimes to be the driver and sometimes the gear is to be the driver. It is further to be understood that where only one member of the pair is to be the driver and that member is to drive continuously in one direction, only one side of the teeth of that member of the pair need be cut according to the method of the present invention.

Further than this, it is to be understood that while the invention has been described in connection with tools of face-mill form, the invention may be practiced with other forms of tools such as reciprocating tools. Still further, it is to be understood that while the invention has been described specifically in connection with the production of spiral bevel gears, it is also applicable to the production of other forms of gears whether straight or spiral and whether bevel or spur. It is also to be understood that while the invention has been described in connection with the cutting of gear teeth, it may be practiced in the grinding of gear teeth with an abrasive wheel, having pressure angles arranged in the same manner. In general, it may be said that the present application is intended to cover any variations, uses, or adaptations of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of generating a longitudinally curved tooth tapered gear which comprises employing a tool which has a side cutting edge that has two different pressure angles, the pressure angle adjacent the tip of the tool being smaller than the presure angle along the greater portion of the height of the tool, positioning said tool in engagement with the gear to be cut so that the portion of the side-cutting edge, which is of smaller pressure angle, will cut the side of a gear tooth in the dedendum portion thereof and the portion of the side-cutting edge which is of greater pressure angle will cut the rest of the active height of the side of the gear tooth, and imparting a cutting motion to the tool while effecting a relative rolling movement between the tool and the work as though a gear, represented by the tool and having teeth whose pressure angle is equal to the pressure angle of the greater portion of the height of the tool, were rolling with the gear being cut.

2. A face-mill gear cutter for cutting gears in a generating operation, comprising a rotary head and a plurality of cutting blades which project beyond one side face of the head in the general direction of the axis of the head, each blade having a side cutting surface which is of straight profile for the greater portion of its height and of one effective pressure angle for such portion of its height, but which is of a smaller effective pressure angle adjacent the tip of the blade, each of the blades having side-cutting edges formed by the juncture of said side surface of the blade and the front face of the blade.

3. A face-mill gear cutter for cutting gears in a generating operation comprising a rotary head and a plurality of cutting blades which project beyond one side face of the head in the general direction of the axis of the head, each of said blades having a side surface at the same side of the blade which is of straight profile and of one positive pressure angle for the greater part of its height and which has a portion projecting therefrom near the tip of the blade and extending to the tip of the blade which is a smaller positive pressure angle than said greater part of the height of the blade, said blade having a side-cutting edge formed at the juncture of the front face of the blade and said side surface, the portion of said side-cutting edge which is formed at the juncture of said projecting portion and the front face being adapted to cut a side surface of a gear tooth in the dedendum portion thereof.

4. A tool for cutting tapered gears in a generating operation having a side surface which is of straight profile and of one positive pressure angle for the greater portion of its height but which has a portion adjacent the tip of the tool which is adapted to cut a side of a gear tooth in the dedendum portion thereof and which is of a smaller positive pressure angle than said greater portion of the height of the tool, said tool having a side-cutting edge formed at the juncture of said side surface and its front face.

5. A gear cutting tool or blade for cutting gears in a generating operation having relieved top and side surfaces and a front face connecting the top and side surfaces, said front face having a part projecting forwardly and upwardly to the top of the tool from a point slightly below the top of the tool, said tool having a side cutting edge formed at the juncture of the front face and one side face, the portion of said side cutting edge which is formed by the juncture of the projecting part of the front face and said side surface being adapted to cut a side of a gear tooth in the dedendum portion thereof.

6. A gear cutting tool or blade for cutting gears in a generating operation having relieved top and side surfaces and a front face, said front face having a part projecting forwardly and upwardly to the top of the tool from a point slightly below the top of the tool, one side face being of straight profile and said tool having a side-cutting edge formed at the juncture of said side face and the front face, the portion of said side-cutting edge which is formed at the juncture of the projecting part of the front face and said side surface being adapted to cut a side of a gear tooth in the dedendum portion thereof.

7. A face-mill gear cutter comprising a rotary head and a plurality of cutting blades that project beyond one side face of the head and are arranged at equal radial distances from the axis of the head, certain of the blades having each a side face of one pressure angle and each of the remaining blades having a corresponding side face which is of a different pressure angle, each blade having a side-cutting edge formed at the juncture of its front face and the described side face, the pressure angles of the said side faces of the two groups of blades being so chosen that the side cutting edges of greater pressure angle will be effective for the greater part of the effective cutting height of the cutter and the side cutting edges of smaller pressure angle will be effective for only that part of the effective cutting height of the cutter which lies adjacent the top of the cutter so as to cut the dedendum portion of a side of a gear tooth only.

8. A face-mill gear cutter comprising a rotary head and a plurality of cutting blades that project beyond one side face of the head and are arranged annularly about the axis of the head, certain of the blades having each a side face of one positive pressure angle and each of the remaining blades having a corresponding side face of a different positive pressure angle, said blades having side-cutting edges formed at the juncture of the corresponding side faces and the front faces of the blades, the pressure angles of the side faces of the two groups of blades being so chosen that the side-cutting edges of greater pressure angle will be effective for the greater part of the effective cutting height of the cutter and the side-cutting edges of smaller pressure angle will be effective for only that part of the cutting height of the cutter which lies adjacent the tip of the cutter so as to cut the dedendum portion of a gear tooth only, the side faces which are of greater pressure angle being of straight profile.

9. A face-mill gear cutter for generating gears comprising a rotary head and a plurality of annularly arranged cutting blades secured thereto and extending in the direction of the axis of rotation of said head, said blades having side cutting edges thereon consisting of a top portion and a bottom portion, the bottom portion extending for the greater portion of the height of the blade and having a straight profile of positive pressure angle, and the top portion extending at a different and lesser pressure angle.

10. A face-mill gear cutter for generating gears comprising a rotary head and a plurality of annularly arranged cutting blades secured thereto, the cutting portions of said blades extending beyond the face of said head in the general direction of the axis of rotation of said head, said blades having side cutting edges thereon consisting of a top portion and a bottom portion, the bottom portion extending for the greater portion of the height of the blade and having a straight profile of positive pressure angle, and the top portion extending at a positive pressure angle which is different and lesser than the pressure angle of said bottom portion.

11. A face-mill gear cutter for generating gears, the teeth of which have profiles that are relieved in the dedendum portion thereof, comprising a rotary head and a plurality of annularly arranged side cutting blades secured thereto, the cutting portions of said blades extending beyond the face of said head in the general direction of the axis of rotation of said head, some of the side cutting edges of said blades having a positive pressure angle and straight profile for generating the unrelieved portion of the profile of said gear teeth and some of the side cutting edges of said blades having a positive pressure angle of different and lesser pressure angle for generating said relieved dedendum portion of said gear teeth, the line of each of the first mentioned side cutting edges intersecting the line of each of the second mentioned side cutting edges when said lines are projected into a common radial plane, said intersection being at the point corresponding to the commencement of the relief in the dedendum portion of the gear tooth profile.

12. A face-mill gear cutter for generating gears, the teeth of which have profiles that are relieved at the bottom portion thereof, comprising a rotary head and a plurality of annularly arranged cutting blades secured thereto and extending in the general direction of the axis of rotation of said head, said blades having effective side cutting edges of positive pressure angle and straight profile for generating the greater portion of the profile of said gear teeth and having effective side cutting edges of different and lesser pressure angle for generating said relieved portion of said gear teeth.

13. A face-mill gear cutter for generating gears comprising a rotary head and a plurality of annularly arranged cutting blades secured thereto and extending in the general direction of the axis of rotation of said head, said blades having lower side cutting edges extending for the greater portion of the height of the blades and having a straight profile of positive pressure angle, and having upper side cutting edges extending at a different and lesser positive pressure angle.

14. A face-mill gear cutter for generating gears, the teeth of which have profiles that are relieved at the bottom thereof, comprising a rotary head and a plurality of annularly arranged side cutting blades secured thereto, the cutting portions of said blades extending beyond the face of said head in the general direction of the axis of rotation of said head, some of the side cutting edges of said blades having a positive pressure angle and straight profile for generating the unrelieved portion of the profile of said gear teeth and others of the side cutting edges of said blades having a positive pressure angle different and lesser than the first mentioned pressure angle for generating said relieved portion of said gear teeth.

15. A face-mill gear cutter for generating gears, the teeth of which have profiles that are relieved at the bottom thereof, comprising a rotary head and a plurality of annularly arranged side cutting blades secured thereto, the cutting portions of said blades extending beyond the face of said head in the general direction of the axis of rotation of said head, some of the side cutting edges of said blades having a positive pressure angle and straight profile for generating the unrelieved portion of the profile of said gear teeth and some of the side cutting edges of said blades having a different and lesser positive pressure angle for generating said relieved portion of said gear teeth, the line of each first mentioned side cutting edges intersecting the line of each second mentioned side cutting edges below the top of said blades when said lines are projected into a common radial plane.

16. A face-mill gear cutter for generating gears, the teeth of which have profiles that are provided with extra relief or clearance at the bottom portion thereof, comprising a rotary head and a plurality of annularly arranged cutting blades secured thereto, the cutting portions of said blades extending beyond the face of said head in the general direction of the axis of rotation of said head, one of said blades having a side cutting edge of positive pressure angle and straight profile extending from the bottom of the cutting portion of said blade toward the top thereof for the greater portion of the height of said blade and another of said blades having a side cutting edge of positive and lesser pressure angle at the top of said blade.

17. A face-mill gear cutter for generating gears, the teeth of which have profiles that are provided with extra relief or clearance at the bottom portion thereof, comprising a rotary head and a plurality of annularly arranged cutting blades secured thereto, the cutting portions of said blades extending beyond the face of said head in the general direction of the axis of rotation of said head, one of said blades having a side cutting edge of positive pressure angle and straight profile extending from the bottom of the cutting portion of said blade toward the top thereof for the greater portion of the height of said blade and another of said blades having a side cutting edge at the top of said blade of a positive and lesser pressure angle, said blades being so mounted in said head that the line of the side cutting edge of said second mentioned blade intersects the line of the side cutting edge of said first mentioned blade below the top of said blade when said lines are projected into a common radial plane.

18. A face-mill gear cutter for generating gears, the teeth of which have profiles that are relieved at the bottom portion thereof, comprising a rotary head and a plurality of annularly arranged cutting blades secured thereto, the cutting portions of said blades extending beyond the face of said head in the general direction of the axis of rotation of said head, said blades having effective side cutting edges of positive pressure angle and straight profile for generating the greater portion of the profile of said gear teeth and having effective side cutting edges of positive pressure angle different and lesser than the first mentioned pressure angle for generating said relieved portion of said gear teeth, the line of each of the first mentioned effective side cutting edges intersecting the line of each of the second mentioned effective side cutting edges below the top of said blades when said lines are projected into a common radial plane.

19. A face-mill gear cutter for generating gears comprising a rotary head and a plurality of annularly arranged cutting blades secured thereto, the cutting portions of the blades projecting beyond one face of the head in the general direction of the axis of rotation of the head and being all of the same height, each cutting portion having one side surface which is formed adjacent to the tip of the blade with a part which projects laterally beyond the main portion of said side surface, each cutting portion having a side cutting edge formed at the juncture of said side surface and the front face of the cutting portion, the portion of the side cutting edge, which is formed by the projecting part of the side surface and the front face of the cutting portion, being adapted to generate a side of a gear tooth adjacent the bottom thereof.

20. A face-mill gear cutter for generating gears comprising a rotary head and a plurality of annularly arranged cutting blades secured thereto to extend in the general direction of the axis of rotation of the head, the cutting portions of the blades being all of the same height, certain of the blades having side cutting edges at one side and each of the remaining blades having side cutting edges at the same side which project laterally beyond the side cutting edges of the first mentioned blades adjacent the tips of said first mentioned blades so that the side cutting edges of the first mentioned blades will be effective for the greater part of the effective cutting height of the cutter while the side cutting edges of the remaining blades will be effective for only that part of the effective cutting height of the cutter which lies adjacent the tip of the cutter so as to generate a side of a gear tooth adjacent the bottom of the tooth only.

21. A face-mill gear cutter for generating gears comprising a rotary head and a plurality of annularly arranged cutting blades secured thereto, the cutting portions of the blades projecting beyond one face of the head in the general direction of the axis of rotation of the head, each cutting portion having a side cutting edge formed at the same side of the blade which is of one pressure angle for the greater portion of the height of the cutting portion and of lesser pressure angle adjacent the tip of the blade, the lesser pressure angle portion of the side cutting edge being adapted to generate the side of a gear tooth adjacent the bottom thereof.

22. A face-mill gear cutter for generating gears comprising a rotary head and a plurality of annularly arranged cutting blades secured thereto, the cutting portions of the blades projecting beyond one face of the head in the general direction of the axis of rotation of the head and being all of the same height, each cutting portion having a side cutting edge formed at the same side of the blade which is of one positive pressure angle for the greater portion of the height of the cutting portion and which is of lesser positive pressure angle adjacent the tip of the cutting portion, the lesser pressure angle portion of the side cutting edge being adapted to generate the side of a gear tooth in the dedendum portion thereof.

23. The method of generating the side tooth surfaces of a longitudinally curved tooth tapered gear which is subsequently to be lapped, which comprises positioning a face mill gear cutter, that has an effective side-cutting portion of one pressure angle for the greater portion of the effective cutting height of the cutter and that has an effective side-cutting portion adjacent the tip of the cutter which protrudes laterally beyond the rest of the side cutting portion, in engagement with the work, and rotating the cutter on its axis while effecting a relative rolling motion between the cutter and work so that the side cutting portion, which is effective for the greater portion of the effective height of the cutter, will generate the greater part of the active side surface of a tooth of the gear while the protruding part of the effective side cutting portion will generate the side surface of the gear tooth in the dedendum thereof to be set back with reference to the main portion of the active tooth height.

24. The method of generating the side tooth surfaces of a longitudinally curved tooth tapered gear which is subsequently to be lapped, which comprises employing a face-mill gear cutter that has side-cutting edges at one side of two different pressure angles, the side-cutting edges of smaller pressure angles intersecting the side-cutting edges of the larger pressure angle when said side-cutting edges are projected into a common radial plane and being effective for only that portion of the effective cutting height of the cutter which lies adjacent the tip of the cutter, and rotating said cutter in engagement with a gear blank while effecting a relative rolling motion between the cutter and blank so that the side-cutting edges of larger pressure angle generate a curve of one pressure angle on a side of a gear tooth and the side-cutting edges of lesser pressure angle generate a different curve on the same side of the gear tooth near the bottom of said tooth which is inclined to the first curve and which is set back with reference to the first curve.

FREDERICK E. McMULLEN.